Fig. 1.

- STEP 1: CONTACTING PRE-FORMED SUPPORT WITH LIQUID SYSTEM COMPRISING Pt AND Sn COMPOUNDS
- STEP 2: REDUCING METALLIC COMPOUNDS (CHEMICALLY OR ELECTROLYTICALLY)
- STEP 3: LEACHING
- STEP 4: WASHING

INVENTORS
RICHARD A. HESS
CHARLES C. LIANG

*William Klabunde*
ATTORNEY.

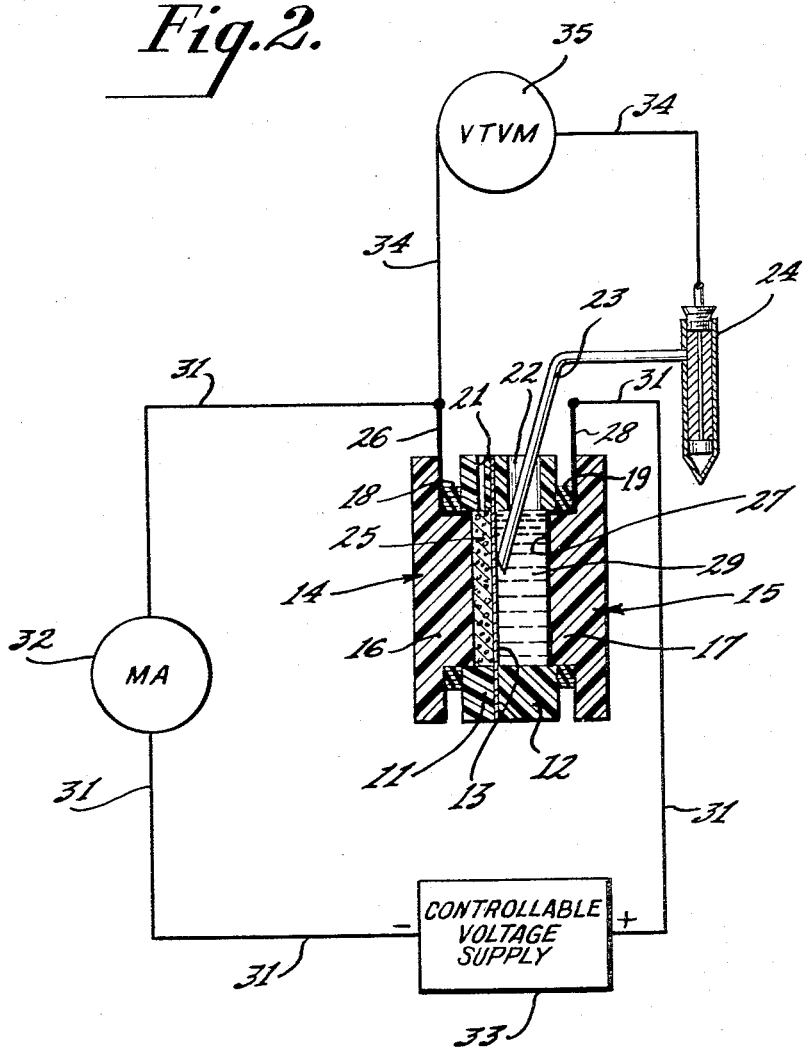

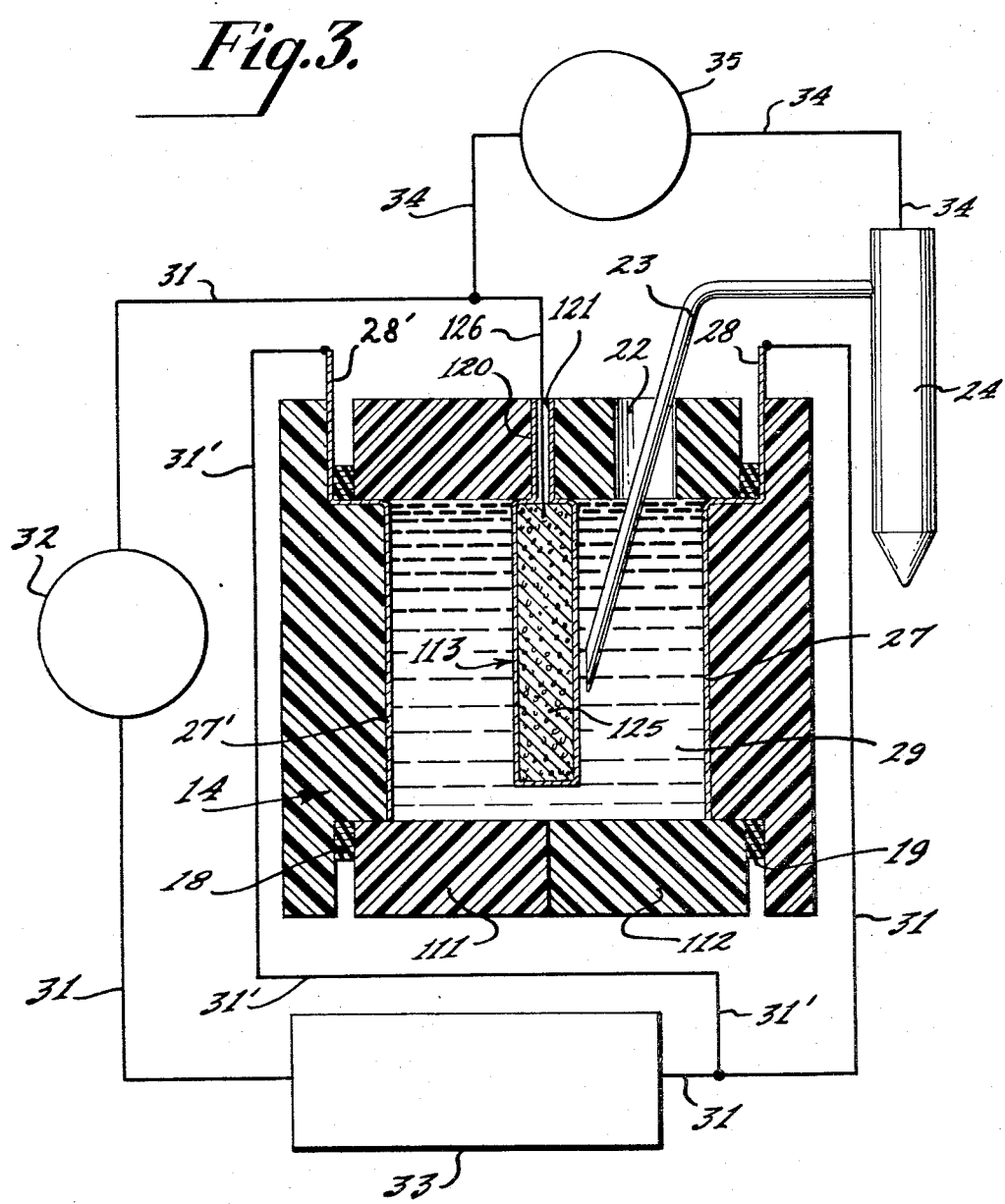

United States Patent Office 3,340,097
Patented Sept. 5, 1967

3,340,097
FUEL CELL ELECTRODE HAVING SUR-
FACE CO-DEPOSIT OF PLATINUM, TIN
AND RUTHENIUM
Richard A. Hess, Claymont, Del., and Charles C. Liang, Pratt, W. Va., assignors to Air Products and Chemicals Inc., Philadelphia, Pa., and Northern Natural Gas Company, Omaha, Nebr., both corporations of Delaware
Filed Jan. 22, 1964, Ser. No. 339,546
11 Claims. (Cl. 136—120)

This invention relates to improvements in a fuel cell electrode employed in promoting electrochemical reactions, such as the electrochemical oxidation of fuel for the generation of electric current, and to a method for making the same.

Dependent upon the type of fuel cell in which the electrode is to be employed and the nature and physical state of the reactant and electrolyte materials involved, the base or support material of the electrode may be porous, non-porous, high surface area or otherwise, metallic or non-metallic, etc. In any case, it is essential that the material selected be compatible with the electrolyte so as to avoid corrosion problems, and that the material be electro-conductive so that the electrical current generated at the multiplicity of active sites where reactants, electrolyte and catalyst come together can be conveyed to the terminal conductor leading to the external fuel cell circuit. Typical of the materials deemed suitable for the electrode base or support, though not necessarily limited thereto, are the conductive carbonaceous materials, such as baked carbon or graphite, and non-corrosive metallic materials.

In the field of electro-chemistry, the use of supported catalysts is well known. While various individual metals or combinations of metals in Groups I–B and VIII of the Periodic Table of the Elements, supported upon either metallic or carbonaceous base materials, have exhibited an appreciable catalytic effect in promoting electro-chemical reactions, platinum in particular has been outstanding in this respect when used either alone or as a combining catalytic element. This is especially true in the fuel cell art, where platinum supported on a conductive, high surface area electrode base material, such as porous baked carbon, has been demonstrated to be highly efficient for the electro-chemical oxidation of various fuels for the production of electrical current.

It is known also that certain metals of Groups I–B and VIII, other than platinum, have a promotional effect on the catalytic activity of platinum, such that the combination or alloying of such metals with platinum produces a catalytic effect which, for certain applications, is superior to that produced by platinum alone.

An extensive investigation was conducted with the view of further enhancing the activity of conductive catalytic electrodes for use particularly in fuel cells and other electro-chemical devices, wherein it was found that tin exhibited exceptional properties as a promoter or combining metal in association with platinum. Also effective, but to a lesser extent, were antimony and arsenic.

It was further discovered that this effect of tin was evidenced not only with platinum alone but also in tri-metallic combinations wherein platinum associated with a known promoter metal, such as ruthenium, was even further improved by the addition of tin. The aforesaid investigation involved co-deposition of the metals upon a conductive support or base material by various methods, including chemical impregnation and electro-deposition. The activated supports produced were evaluated as fuel electrodes in a test fuel cell for the electro-chemical oxidation of methanol, the cell being operated respectively with acidic and basic electrolytes. In the three-metal combination, fuel electrodes comprising platinum, tin and ruthenium were found most effective.

In accordance with the invention, an improved catalytic fuel cell electrode is provided by the application of a plurality of activating metals comprising platinum and tin to an electrode body or support composed of conductive base material. In one preferred form of electrode the platinum and tin are supplemented by a co-deposit of other metal, such as ruthenium, to promote the activity of the platinum/tin combination. The conducting material which forms the electrode body or base material may be either metallic or carbonaceous. Although not limited thereto, carbonaceous materials considered especially effective as base material to support the catalytic metallic components are baked carbon and graphite. The baked carbon or graphite used in forming the electrode support may be one of any well-known commercial grades having porosity and pore diameter characteristics suitable for electrode use.

The combination of active metallic components comprising platinum and tin are applied to the electrode body by co-deposition from a liquid body containing compounds of the individual metals, with simultaneous or subsequent reduction of the metallic compounds in situ.

In its broader aspects, the invention contemplates the application of the aforementioned activating metals to conductive supports of any size or shape, having smooth or rough surface and being either porous or non-porous.

Where, as in a gas diffusion type of operation, there is need for a high degree of porosity in the finished electrode, the support or base for the applied activating metals may comprise a porous, conductive carbonaceous material or a sintered or felted conductive metallic material, each of which will provide high surface area. If porosity is not essential as a characteristic of the finished electrode, any of a number of conductive, non-porous base materials compatible with the intended fuel cell electrolyte may be employed as a support. Where the surface of such non-porous base material is relatively smooth, such as to provide little more surface area than is encompassed within its geometric limits, such support surface may be treated to increase its area, as by controlled application of a surface coating of additional conductive material preliminary to the co-deposition of the activating materials.

According to the method of the invention, the co-deposition upon the support material of the selected group or combination of metals comprising platinum and tin is accomplished either electrolytically or by chemical impregnation from a liquid system essentially comprising substantial minor amounts of platinum and tin compounds, with or without the addition of promoter metal compounds, all dissolved in a solvent material. In either case, the actual co-deposition of activating metals upon the surface of the support material is effected by reduction, in the specific sense that there is accomplished a reduction in the oxidation state of the several metals.

Where the selected method of applying the activating metals to the support is by electro-deposition, the reduction reaction is effected electrolytically as the metals are actually deposited from their respective compounds upon the conductive areas of the support, the conductive support itself being used as an electrode in the electrolytic reaction.

Where the metals are applied to the support by a chemical impregnation technique, the necessary reduction is effected chemically by a reducing agent as a separate and distinct step in the process, after the solution of metallic compounds has been well distributed over the surface of or throughout the high internal surface area of the support. Such chemical reduction may be effected, for example, with acidified potassium formate solution having a pH in the range of about 2.0–6.0.

The particular choice of the base material for the support will be dictated by the type of fuel cell system and electro-chemical reaction in which the electrode is to be employed, as well as by other requirements of the contemplated operation. The necessity for electro-conductivity in the finished electrode will to a great extent dictate the choice of base material for the support or electrode body. Compatibility of both the support material and the applied catalytic material with the electrolyte is also an important consideration. The proper choice as to both may depend upon whether the fuel cell system is acidic or basic.

In various fuel cell operations, commercial grades of porous baked carbon have proved to be highly effective and efficient as base materials in the formation of catalytic electrode supports, the carbon generally being molded or otherwise formed in the shape of thin bodies having a broad surface, such as flat discs or plates. Typical of the type of porous baked carbon which may be employed is a commercial Grade 60 carbon having an effective porosity of 48% and an average pore diameter of 33 microns. It is to be understood, however, that the invention is not limited to the use of this specific grade of baked carbon or, for that matter, to the use of carbon itself. Any conductive material satisfying the other requirements with respect, for example, to porosity, surface area, compatibility, strength, etc., may be used as an electrode support material. Examples of other materials which might well serve as a base or support are platinum in the form of a wire, mesh or screen, platinum black or other finely-divided metals of the platinum group, and graphite or other forms of conductive carbon.

In one preferred mode of carrying out the method of the invention, a preferred solid support of the desired composition and form, and having the support characteristics required in its intended use, is initially provided or prepared. A liquid system comprising salts of at least platinum and tin, and possibly one or more salts of other promoter metals selected from Groups I–B and VIII of the Periodic Table of the Elements, in a solvent is then prepared. The solid support which may be porous or non-porous, is contacted with the liquid system so as to penetrate into the pores or cover the surface, and the respective metals of the group of metallic compounds in the liquid system are then deposited as elemental metal or as alloy upon the solid support material by reducing the metallic compounds within the liquid system. Such reduction may be either chemical or electrolytic. Any excess solvent may be removed either prior to or during the actual reduction step, dependent upon whether chemical or electrolytic deposition is employed. The active metal coated or impregnated support is then leached, for example, in 30% sulfuric acid, to remove any excess tin, and is then washed, as with distilled water, to remove metallic ions or other impurities.

The platinum and tin, as well as the other promoter metals, if any, are preferably, though not necessarily, supplied to the liquid system as salts of the respective metals. Platinum may conveniently be supplied in the form of chloroplatinic acid, tin in the form of stannic chloride, and ruthenium, for example, as ruthenium trichloride. Other platinum/tin/promoter metal solutions may be used, however, particularly where metal deposition is made by the chemical impregnation technique. For example, soluble amine complex solution, colloidal dispersions of the metals, etc., may be used. For electrolytic deposition techniques, however, acid solution is preferable.

Another method, in accordance with the invention, for effecting a platinum-tin or a platinum/tin/promoter metal deposition upon a porous or non-porous, conductive base material is by a metal ion exchange or displacement technique. In such technique, an active metal, such as cobalt, nickel, zinc, etc., is first deposited upon the electrode support material either by chemical impregnation or electrolytically. The amount of such active metal deposit should be in excess of the stoichiometric requirements for replacement by the platinum/tin combination or by the platinum/tin/promoter metal combination.

The support containing the deposit of active metal is then contacted with a liquid system comprising salts of the other desired metals in acid solution for a period of time sufficient to complete the exchange between the first-deposited active metal and the combination of metals in the liquid system. Following the ion exchange treatment, the excess of the active metal is removed by acid leaching, such as in 30% sulfuric acid, and the support is then washed, as with distilled water, to remove unwanted ions, such as chloride ions if chloride salts have been used in preparing the liquid system.

A further technique for applying catalytic metallic components to a porous, conductive electrode body or support, is by a confined or contained catholyte electrolysis. In this mode of activation, the porous, conductive body is completely enclosed within and occupies the whole of the catholyte chamber of the electrolysis cell or unit, so that all the liquid catholyte comprising the metallic salts in acid solution will necessarily be dispersed throughout and wholly contained within the pore volume of the porous body. In this method of electrode preparation, the porous conductive body or support may be encapsulated within a closely-fitted, semi-permeable, ion-exchange membrane and provided with an external electrical lead or conductor. The encapsulated body is submerged in a body of compatible liquid anolyte which, in turn, is in contact with the anode.

Alternatively, the porous conductive body may be fitted snugly into a cathode chamber having a semi-permeable, ion-exchange membrane material for one boundary wall which wall serves as a divider between the catholyte and anolyte chambers of the electrolysis cell.

In a preferred application of the latter technique, involving electrolytic reduction of the metallic compounds or complexes in the liquid catholyte and co-deposition of the metals or intermetallic alloys of the same, the electrolysis is carried out by a flow of electrical current through the electrolysis unit. The electrolysis is carefully controlled, either as to voltage or current, in order to reduce the oxidation state of the intermetallic compound or complex, as the case may be, to zero valence. In the process of reduction the several metals, or possibly an electrolytic alloy of the metals, are deposited throughout the pores and upon the exposed surface of the porous electrode body. When reduction to zero valence has been accomplished all the metallic components of the liquid body will have been co-deposited upon the electrode.

For a fuller understanding of the invention reference may be had to the following description and claims taken in connection with the accompanying drawings forming a part of this application, in which FIGURE 1 is a diagrammatic illustration of the sequential steps performed in carrying out the invention in its broadest aspects;

FIGURE 2 is a diagrammatic arrangement of a typical electrolysis unit for carrying out a contained-catholyte electrolysis for co-deposition of platinum, tin, and possibly one or more other metals which will promote the catalytic activity of the platinum/tin combination; and FIGURE 3 is a modification of the contained-catholyte electrolysis technique illustrated in FIGURE 2, wherein the porous electrode body is at least partially encapsulated in a semi-permeable, ion-exchange membrane and the encapsulated portion is suspended in a body of liquid catholyte.

Referring to FIG. 1 of the drawings, the invention is diagrammatically illustrated as comprising four basic steps which are followed in each of the disclosed techniques for effecting the co-deposition of platinum and tin, and possibly one or more additional metals, upon a conductive electrode body.

The four steps describe the broad technique for co-deposition of the active metal components of the electrode common to both chemical impregnation and electro-deposition.

In Step 1, the electrode body or support is contacted with a liquid system containing at least platinum and tin compounds and preferably one or more compounds of other metals which have a known promotional effect on the catalytic activity of platinum. In the impregnation technique, the electrode body, if porous, is saturated with the liquid; if not porous, but only surface treated to provide increased surface area, the electrode body is completely wetted by the liquid. In the electrolytic technique, the liquid system containing the metals desired to be co-deposited is prepared as the electrolyte for an electrolysis cell on which the conductive electrode body or support is made to function as the cathode. As a modification of the latter technique, a porous conductive electrode body or support may be saturated or impregnated with the liquid system so as to fill substantially all the larger-size pores and effect maximum distribution of the liquid throughout the porous mass. The electrode is then wholly and closely confined in a catholyte chamber of an electrolysis cell, the dimensions of which chamber coincide with the external dimensions of the electrode. The catholyte chamber may be formed by the combination wall surfaces at one end of the electrolysis cell and a semi-permeable, ion exchange membrane which separates the catholyte chamber from the remaining portion of the cell which is the anolyte chamber. Alternatively, the electrode may be encapsulated by a semi-permeable, ion exchange membrane, the capsule forming the catholyte chamber, and the whole electrode unit suspended in an anolyte chamber. The anolyte chamber in either case contains an anolyte compatible with the impregnating solution, that is, the liquid system, or catholyte. In the metal ion exchange technique, the electrode body or support is initially prepared, either chemically or electrolytically, by the application thereto of an active metal, such as cobalt, nickel, zinc, etc., the active metal being applied in excess of that required for stoichiometric replacement by platinum/tin. The electrode thus treated is then contacted by a liquid system comprising chloroplatinic acid and compounds of tin and possibly other metals. The acid solution releases hydrogen in its reaction with the applied active metal.

In Step 2, the metallic compounds are reduced to leave pure metals and/or metallic alloys deposited upon the liquid-contacted surfaces of the electrode. Such reduction is effected by either chemical or electrolytic means. If chemical reduction is employed, any excess liquid is first separated from the impregnated or surface-wetted electrode body or support and the electrode is permitted to dry for several hours under ambient conditions. The electrode is then contacted with a chemical reducing agent, such as potassium formate solution, to reduce the metallic compounds. If the electrolytic deposition technique is employed, the reduction of the metallic compounds is effected electrolytically within the electrolysis cell. In the case of the metal ion exchange technique, pre-plated metal reduces both and causes the platinum, tin, and metals of the other compounds, if any, to be deposited on the surfaces of the electrode.

In Step 3, the metal activated electrode support is leached, as with a 30% aqueous sulfuric acid solution to remove the excess of active metals.

In Step 4, the leached electrode is water washed to assure removal of all chlorine ions or other undesirable contaminants.

FIG. 2 of the drawings shows a sectional elevation of an electrolysis cell designed to accommodate an electrode support in the shape of a flat circular disc which entirely fills a catholyte chamber.

The electrolysis cell comprises a transversely-split, cylindrical body member consisting of a short portion 11 for the catholyte chamber and a longer portion 12 for the anolyte chamber. Cylindrical body portions 11 and 12 are arranged end-to-end with their common axis in horizontal position, and are separated by a semi-permeable, ion exchange membrane 13 which extends across the cylindrical opening.

Circular end plates 14 and 15 are circumferentially rabbeted at one side to provide circular central portions 16 and 17 which fit snugly into the open ends of cylindrical body portions 11 and 12, respectively.

Both the cell body portions 11 and 12 and the cell end plates 14 and 15 are formed of non-conductive material compatible with the acidic or basic electrolyte materials to be introduced into the catholyte and anolyte chambers.

End plates 14 and 15 are provided with non-conductive seal rings 18 and 19, respectively, which are placed between the flange-like perimeter of the end plates and the outer ends of the assembled body portions 11 and 12. The internal space bounded by body portion 11, membrane 13 and end plate 14 forms the catholyte chamber of the electrolysis cell and the space bounded by body portion 12, membrane 13 and end plate 15 forms the anolyte chamber.

A vent opening 21 is provided in the top wall of body portion 11 to permit escape of gaseous material, such as hydrogen, which may be formed as a reaction product in the catholyte chamber during the electrolytic reaction.

An access opening 22 is provided in the top wall of body portion 12 to permit introduction of liquid anolyte and to freely receive the Luggin capillary or tubulus 23 of a standard mercury/mercurous sulphate reference electrode 24 of standard potential for measuring the half cell voltage or reaction potential.

The porous conductive electrode body 25 which is to be activated by co-deposition of platinum, tin, and possibly other metals is made in the form of a flat circular disc of such configuration as to fit snugly within the catholyte chamber. In assembling the unit, the electrode body 25, which is to function as the cathode of the electrolysis cell, is impregnated with a liquid body, or catholyte, comprising compounds, such as salts, of the metals to be co-deposited on the electrode. In the embodiments illustrated in FIGS. 2 and 3 the liquid catholyte may be, for example, an acid solution of chloroplatinic acid and a chloride of tin, with or without chlorides of other promoter metals, for example, ruthenium. The solution is applied to the porous electrode in any way which will assure substantial filling of all the larger size pores with the liquid body, without any excess of liquid.

When the electrode body 25 is being installed in the cell a ribbon conductor, such as a strip of platinum foil 26, is inserted between the body portion 11 and the end plate 14, with the inner end of the foil in good electrical contact with the conductive electrode 25 and the outer end adapted for connection to the external electrical circuit of the electrolysis cell.

At the anode side of the cell, the inner face of end plate 15 is covered with platinum foil to form the anode 27. The anode also is provided with a ribbon conductor 28 for flow of electrical current between the anode 27 and the external electrical circuit. The conductor 28 fits between the body portion 12 and end plate 15 in the same manner that conductor 26 fits between its corresponding cell members.

The anolyte chamber is filled with an anolyte 29 compatible with the catholyte in the catholyte chamber. For example, a 30% aqueous sulfuric acid solution is introduced into the anolyte chamber of the assembled electrolysis cell through access opening 22.

The external electrical circuit for the cell comprises a main conductive path or circuit 31 connecting the anode and cathode conductors 26 and 28, and containing a milliammeter 32 and a source of electrical current 33 which is controllable as to voltage and current. A secondary electrical circuit comprises a conductive path or circuit 34 connecting the cathode conductor 26 and the terminal of the reference electrode 24, and containing a means for measuring the voltage, such as a vacuum tube voltmeter 35.

Flow of electrical current through the main circuit 31 causes an electrolytic reaction to take place within the catholyte chamber, which is wholly occupied by the impregnated conductive electrode 25, thereby effecting the electrolytic reduction of the metallic compounds in the catholyte and causing the various metals to be co-deposited as metals or possibly metallic alloys upon the internal and external surfaces of the porous conductive electrode, that is, upon those surfaces which are contacted by the liquid system.

FIG. 3 shows an alternative electrolysis cell arrangement for carrying out the contained catholyte technique for electro-deposition of the activating metals throughout the mass of a porous conductive electrode. The portions of apparatus which have an identical or nearly identical counterpart in FIG. 2 are correspondingly numbered for ease of description.

The cylindrical body of the electrolysis cell is split into two portions 111 and 112 joined end-to-end in fluid-tight connection. The porous, conductive electrode support 125 is completely encapsulated by a semi-permeable, ion exchange membrane 113 which is in intimate contact with the entire surface of the electrode, and has a tubular extension 120 projecting through a vent opening 121, which may be formed by grooving one or both of the opposed surfaces forming the joint between body portions 111 and 112. The tubular extension 120 performs two functions. It provides a vent for gaseous material, such as hydrogen, which may be formed during the electrolysis, and it provides an opening for the electrical conductor or cathode contact 126.

In this alternative arrangement, the electrode support 125 is made slightly smaller than the cell chamber in order that the body of liquid anolyte 29 may surround the encapsulated electrode. While the illustrated embodiment shows the encapsulated electrode as being suspended in the body of liquid anolyte by means of the tubular extension 120 of the membrane 113, it is to be understood that the representation is only diagrammatic and that, in a commercial application of the method, it may be desirable to provide a supporting arrangement which will give more stability to the electrode during the electrolysis treatment.

Inasmuch as the cathode is placed in the central region of the cell chamber some distance from each end of the cell body, and since there is liquid anolyte surrounding the cathode, both end plates 14 and 15 may be surfaced with platinum foil anodes 27' and 27 having ribbon conductors 28' and 28, respectively.

To demonstrate the practicability of the alternative methods for preparing the electrode of the invention, as well as the efficiency of the electrode itself, a number of electrodes were prepared and then subjected to conventional versus a normal hydrogen electrode (NHE) testing in a standard half cell for the purpose of determining the polarization characteristics. For the purposes of experimentation, electrode supports composed of Grade 60 baked carbon, which is a known commercial grade of carbon having an effective porosity of about 48% and an average pore diameter of 33 microns, were employed. The supports were in the form of thin flat discs, $3/16''$ thick and having an effective face area of 6.0 cm.$^2$. Sample electrodes were tested in both acidic and alkaline systems, using aqueous solutions of sulfuric acid (30%) and potassium hydroxide (34%), respectively, as the electrolyte, for the electro-oxidation of methanol, formaldehyde, and formic acid. The relevant data for electrode preparation and testing are given below.

EXPERIMENT I

A $3/16''$ thick porous carbon disc of 6.0 cm.$^2$ effective face area, having an effective porosity of about 48% and an average pore diameter of about 33 microns (commercially known as Grade 60 carbon), was impregnated with a solution of chloroplatinic acid containing 15 mg. of Pt and stannic chloride containing 12 mg. of Sn. This is equivalent to a total metals application of between 4 and 5 mg./cm.$^2$ of disc face area or per 0.48 cc. of disc volume. This may be expressed also as a metals application of approximately 8⅓ to 10½ mg./cc. of support. The solution was first heat treated at 60–70° C. for 10–15 minutes to assure a final volume of less than one milliliter. The carbon disc was first dried in an oven at 110° C. for one hour.

After impregnation, the disc was dried at 60° C. for at least 3 hours. The chloroplatinic acid and stannic chloride were reduced to the metallic state by dropwise addition of potassium formate solution (pH=3.1) distributed over the surface of the impregnated carbon disc.

The disc was then subjected to repeated aqueous liquid wash treatment to remove any unreacted tin, and also any remaining chlorine ions. The wash treatment was carried out with distilled water and was quite thorough, the wash water being tested with silver nitrate solution to assure the absence of chlorine ions. The initial aqueous wash could have been made with a 30% sulfuric acid solution, as in later experiments, to more rapidly and effectively remove any unreacted tin.

A series of such discs were prepared in this manner with varying proportions of platinum and tin ranging from 5:2 to 5:12.

The activated discs were then tested as fuel electrodes versus a normal hydrogen electrode (NHE) in a standard half-cell test unit containing 1 M methanol in 30 wt. percent sulfuric acid solution. The effects of the co-deposit of platinum/tin on potential and total current, at temperatures of 25–30° C., 60–65° C. and 80–85° C. and under varying loads ranging from about 10 to 200 ma., were determined. It was found that the electrode having 15 mg. Pt and 12 mg. Sn (5:4 ratio) showed the best performance. The open circuit potential of the cell was about 0.12 v. versus NHE at the higher temperatures. The electrode potential at 200 ma. (about 35 ma./cm.$^2$) was about 0.4 v. versus NHE.

The 15 mg. Pt/12 mg. Sn electrode was then evaluated in an alkaline system in the same half-cell test unit with 1 M methanol in 34 wt. percent potassium hydroxide solution as the electrolyte. At 65° C. and under a load of 375 ma. (65 ma./cm.$^2$) the potential of the cell was 0.32 versus the hydrogen electrode in the same solution, and under a load of 55 ma./cm.$^2$ the potential was 0.3 v. This is about 0.1 to 0.2 volt better than was observed for a platinum on carbon electrode in KOH electrolyte.

In preparing the electrode discs, it was found desirable to pre-dry the discs at about 110° C. for about an hour. It was found important also, for best results, that the discs be impregnated with freshly mixed solutions.

As a further study of the Pt-Sn-C electrode prepared by co-deposition of the metals in accordance with the foregoing chemical impregnation technique, the impregnating solution was changed to chloroplatinic acid and stannous chloride. It being known that these two metallic compounds react to form a complex, it was conjectured that the complex would be reduced to leave an intermetallic compound on the carbon. For this variation of the experiment 0.75 milliliter of chloroplatinic acid (20 mg. Pt/ml.) was mixed with 0.3 milliliter of stannous chloride suspension (60 mg. Sn/ml.). A red complex was formed. The electrode was treated in the same manner as the stannic chloride impregnated electrodes, and then tested for methanol oxidation at 80° C. in the half-cell test unit, with 30 wt. percent sulfuric acid as the electrolyte. The electrode showed a potential curve almost as good as that shown for the stannic chloride impregnated electrode.

EXPERIMENT II

This experimental investigation was carried out for the purpose of determining the effect of employing electrolysis rather than chemical impregnation and chemical reduction for co-depositing the combination of platinum and tin on the porous conductive electrode. As a first approach, the 5:4 ratio Pt/Sn solution of chloroplatinic acid and stannic chloride used for the impregnation technique of Experiment I was used as the electrolyte in an electrolysis cell. A porous carbon electrode support identical to that used in Experiment I was employed as the cathode and a platinum foil was used as the anode.

The platinum and tin were then electrolytically co-deposited upon the outer geometric surface or exposed surface region of the electrode. The electrolysis was carried out at both pulsed and constant DC current, with no apparent advantage for either type, and also at constant electrode potential. In the case of pulsing current, the pulses were of 6.67 milliseconds duration, having a constant DC current value of 15–20 ma./cm.$^2$ of carbon surface, at a rate of 30 pulses/sec. The same current range was employed for constant DC. The electrolysis treatment effected the reduction of the platinum and tin compounds and produced a uniformly distributed co-deposit of the metals on the surface of the electrode. The treatment was continued for a period of 10 minutes. The total metals deposition, as in Experiment I, again amounted to between 4 and 5 mg./cm.$^2$ of disc face area, or approximately 8⅓–10½ mg./cc. of support.

Testing of the electrodes so produced, in the same manner as for those produced in Experiment I showed a significant improvement for these electrodes over electrodes containing platinum alone.

In order to develop a more reproducible technique the electrodes were then prepared at a constant electrode potential, which was readily accomplished through manual control of the current supply at the source. In this method, the electrolysis cell was so arranged that the carbon electrode support, or substrate, occupied the entire volume of the catholyte chamber, which was separated from the anolyte chamber by a semi-permeable, ion exchange membrane. The cathode was provided with a platinum foil contact and the anolyte chamber was provided with a platinum foil anode.

An amount of a freshly prepared mixture of aqueous solution of chloroplatinic acid and of stannic chloride, in a 5:3 Pt/Sn ratio and in an amount equivalent to the pore volume of the carbon disc, was added to the latter in such manner as to insure an even distribution of the solution throughout the substrate. The anolyte chamber was filled with a 30 wt. percent sulfuric acid solution, which was compatible with the catholyte, as required. In this contained-catholyte technique the electrolysis treatment is continued until all the metallic compounds contained within the pore structure of the substrate are reduced, as evidenced finally by a steady flow of electrolysis current through the cell. Experimentation along these lines revealed that the most active electrode surfaces were produced at an electrode potential of .000–.100 v. versus NHE. Under testing in the standard half cell test unit, the electrodes produced by the foregoing electrolytic co-deposition techniques revealed superior characteristics compared to electrodes containing platinum alone.

As a variation of the foregoing contained-catholyte technique, carbon electrode support discs may be completely encapsulated by semi-permeable membranes, closely fitted and having a foil conductor extending through the top portion of the membrane. The encapsulated discs are then almost completely submerged in liquid anolyte for the electrolysis treatment.

EXPERIMENT III

As a further variation within the broad concept of the method of the invention, a metal exchange technique was next employed. The same type of electrode support in the form of carbon discs was employed. However, the respective electrode supports were first given electro-deposited coatings of nickel and of cobalt from solutions containing 30 mg. of the metals as chlorides. The plating was accomplished by a DC current flow of .100 ampere for 10 minutes in each case. The active metal coated substrates were then contacted by an impregnating solution containing a 5:3 ratio of Pt/Sn in a chloroplatinic acid-stannic chloride solution. The nickel and cobalt in each case go into solution in the slightly acidic chloroplatinic acid, being displaced by the platinum and tin. The reaction is complete when the contact solution changes color, from yellow to blue-green for nickel and from yellow to pink for cobalt.

In this technique, as in the electrolytic co-deposition techniques, the electrodes are leached for 30 minutes in 30% sulfuric acid solution following the Pt/Sn deposition, after which they are thoroughly washed with distilled water to remove any residual chlorine ions. While an acid leach followed by a thorough water wash to remove unreacted metals and chlorine ions, respectively, is the recommended procedure for metallic co-deposition by the electrolytic and metal exchange techniques, in the chemical impregnation technique the undesirable residual constituents may be removed by repeated washing with distilled water. However, even in the latter case leaching is beneficial, if only in the interest of saving time and of insuring the removal of any traces of unreacted metal, particularly any excess tin.

In carrying out the investigations, fuel electrodes were prepared also with combinations of platinum and individual metals other than tin. In all of the tested combinations, varying proportions of the metals were tried and, in the case where the electrodes were prepared by the chemical impregnation technique, other chemical reducing agents were tested. Although combinations of platinum with antimony and with arsenic showed good activity, tin combined most effectively with platinum to produce an outstanding improvement in electrode activity, considerably superior to the activity of platinum alone or to the combination of platinum with other metals.

Following the experimental investigation of the combination of platinum and tin co-deposited on carbon for the production of catalytically active fuel cell electrodes, a further investigation was carried out for the purpose of determining whether such electrodes could be improved by the addition of certain promoter metals known to enhance the catalytic activity of platinum. Ruthenium, in particular, had earlier been established as a good promoter metal for increasing the catalytic activity of platinum electrodes. A study of three-metal systems including platinum and tin was therefore made. Both palladium and ruthenium were tried as the promoter metals. Three-metal electrodes were prepared by each of the herein described techniques.

EXPERIMENT IV

First, the tri-metallic electrodes comprising platinum, tin and ruthenium on carbon were prepared by the chemical impregnation technique. A carbon disc similar to that used in the bi-metallic electrodes was impregnated with an aqueous solution of stannic chloride containing 12 mg. of tin. The disc was then dried at 60° C. for 3 hours. The dried disc was then impregnated with an aqueous solution of chloroplatinic acid and ruthenium trichloride containing 15 mg. of platinum and 8 mg. of ruthenium. This 5:4:2⅔ ratio of platinum, tin and ruthenium, respectively, gave a total metals deposit of between 5 and 6 mg./cm.$^2$ of disc face area, or slightly more than 12 mg./cc. of support. The disc was then dried as before.

The dried, impregnated disc was then reduced in a two-stage treatment, first by contact with 1.5 milliliters of 34% potassium hydroxide solution and methanol, mixed in a proportion of 2:1, for one hour, and then with one milliliter of formic acid (reagent) for 2 hours. The electrode is leached in 30% sulfuric acid solution for 30 minutes and then thoroughly washed with distilled water until completely free of chlorine ions. When the electrode so produced was tested in a standard half-cell unit for the oxidation of methanol it demonstrated a higher activity and better polarization characteristics than was shown by the platinum-tin on carbon electrode.

EXPERIMENT V

A trimetallic platinum/tin/ruthenium electrode was prepared by the electro-deposition technique. A standard carbon disc was impregnated with a mixed aqueous solution of chloroplatinic acid, stannic chloride and ruthenium trichloride containing 15 mg. of platinum, 6 mg. of tin, and 3 mg. of ruthenium. This corresponds to a total metals application of about 4 mg./cm.$^2$ of disc face area, or about 8⅓ mg./cc. of support. The impregnated disc was then placed in an electrolysis cell as the cathode, using the contained-catholyte technique. A semi-permeable, ion exchange membrane separated the cathode from the anolyte chamber containing 30% sulfuric acid. A bright platinum foil served as the anode.

A DC plating current, adjusted to constant .000 v. potential vs. NHE, was applied to the cell for about 10 minutes. The reduced electrode was leached in 30% sulfuric acid for 30 minutes and then washed with distilled water until free of chlorine ions.

The chemically impregnated and electro-deposited platinum/tin/ruthenium electrodes of Experiments IV and V were tested in a standard half cell vs. NHE for the oxidation of methanol. The tri-metallic electrodes showed appreciably better activity and polarization characteristics than did the bi-metallic platinum/tin electrodes.

For methanol oxidation in 30% sulfuric acid solution at 80–85° C. the electro-deposited electrode proved to be slightly better than the chemically impregnated electrode, showing a polarization at 35 ma./cm.$^2$ of only 0.36 to 0.37 v. vs. NHE. This was about 30 to 40 millivolts better than the comparable platinum/tin electrode. A life test made on such electrode, comprising a 5 hour run under a current load of 250 ma. for the oxidation of methanol in 30% sulfuric acid solution showed no appreciable amount of deactivation.

Metals of known promotional activity, other than ruthenium, were combined with platinum and tin in varying proportions and by each of the described techniques. Testing of the electrodes so prepared in a half-cell test unit revealed a clear superiority of the platinum/tin/ruthenium combination on carbon of the type herein referred to as a commercial Grade 60 carbon. The optimum ratio of the metallic components to be deposited on the porous carbon electrode support was found to be in the order of 5:2:1 to 5:2.5:1, on a weight basis, corresponding to a total metals deposit of about 4–4¼ mg./cm.$^2$ of disc face area, or about 8⅓–9 mg./cc. of support and the most satisfactory co-deposition technique was found to be that of contained-catholyte, controlled potential electrolysis. This preferred technique provided the most reproducible method for preparing the activated electrodes.

Repeated testing of electrodes comprising platinum on carbon; platinum/tin on carbon; platinum/ruthenium on carbon; and platinum/tin/ruthenium on carbon, with 1 molar methanol in 30% sulfuric acid solution revealed a clear superiority for the combination of tin with either platinum alone or with platinum and ruthenium.

The co-deposit of these metals was made on other grades of carbon and on graphite, but the Grade 60 porous baked carbon herein described proved most practicable. Although the carbonaceous type of electrode support has proved to be the most efficient for most practical purposes, the activation techniques of the invention are applicable to other types of conductive supports, such as metallic supports, provided they are compatible with the solutions with which they are brought in contact during preparation or subsequent use.

Obviously, many modifications and variations of the invention as hereinbefore set forth may be made without departing from the spirit and scope thereof and therefore only such limitations should be imposed as are indicated in the appended claims.

The invention claimed is:

1. A fuel cell electrode comprising a solid conductive support having a substantially uniform surface co-deposit of metals consisting essentially of platinum and tin, said metals constituting a relatively minor weight percent of the support material and said platinum and tin being deposited in a weight ratio of about 5:4 to 5:3, respectively.

2. A fuel cell electrode as in claim 1 in which said conductive support is porous, and said co-deposit of metals is applied to both external and internal surface areas thereof.

3. A fuel cell electrode as in claim 2 in which said porous conductive support comprises carbonaceous material.

4. A fuel cell electrode as in claim 3 in which said porous, conductive, carbonaceous material is a commercial grade baked carbon having an effective porosity of about 48% and an average pore diameter of about 33 microns, said co-deposit of platinum and tin being in total amount about 4–5 mg. of metal per .48 cc. of porous support.

5. A fuel cell electrode as in claim 1 in which said surface co-deposit of metals comprises also ruthenium in a minor amount up to about 15% of the total of co-deposited metals.

6. A fuel cell electrode as in claim 5 in which said platinum, tin and ruthenium are applied in a ratio of between about 5:4:1 and 5:2:1.

7. A fuel cell electrode as in claim 1 in which said support is non-porous and said co-deposit of metals is applied to the exposed surface areas of said support.

8. A fuel cell electrode as in claim 2 in which the effective porosity and average pore diameter of said porous support are such as to permit substantial impregnation of the support by a liquid body containing salts of said metals.

9. A fuel cell electrode as in claim 5 in which said platinum, tin and ruthenium are applied to said support in a ratio of between about 5:2.5:1 to 5:2:1.

10. A fuel cell electrode as in claim 1 in which said electrode is encapsulated by a semi-permeable, ion exchange membrane.

11. A fuel cell electrode comprising a porous conductive support of carbonaceous material having an effective porosity of about 48% and an average pore diameter of about 33 microns, said support having uniformly-distributed metallic co-deposits consisting essentially of platinum, tin and ruthenium upon the external exposed surface and internal pore surfaces thereof in a weight ratio of between 5:2.5:1 to 5:2:1, said total metals deposit constituting a relatively minor weight percent of the carbonaceous support.

References Cited

UNITED STATES PATENTS

| 2,027,358 | 1/1936 | Powell et al. | 204—47 |
| 2,778,786 | 1/1957 | Pearlman et al. | 204—47 |
| 3,150,065 | 9/1964 | Fatzer | 204—47 |
| 3,183,123 | 5/1965 | Haworth | 136—120 |
| 3,239,382 | 3/1966 | Thompson | 136—120 |

FOREIGN PATENTS

| 936,467 | 7/1964 | Great Britain. |

WINSTON A. DOUGLAS, *Primary Examiner.*

ALLEN B. CURTIS, *Examiner.*

A. SKAPARS, *Assistant Examiner.*